July 7, 1936.  B. P. JOYCE  2,046,518
SEPARABLE GUN MOUNT
Filed May 25, 1935  4 Sheets-Sheet 1
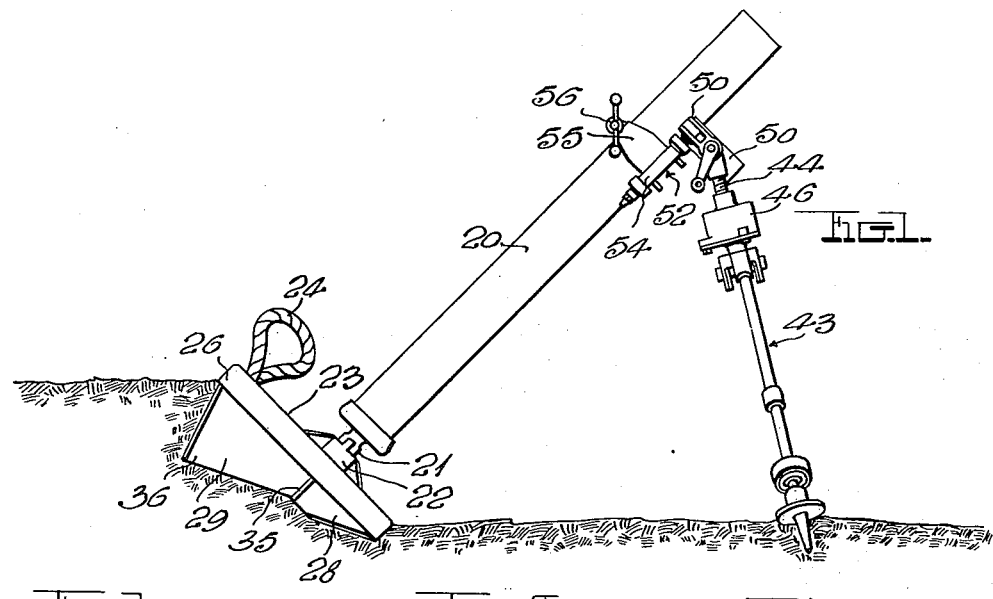
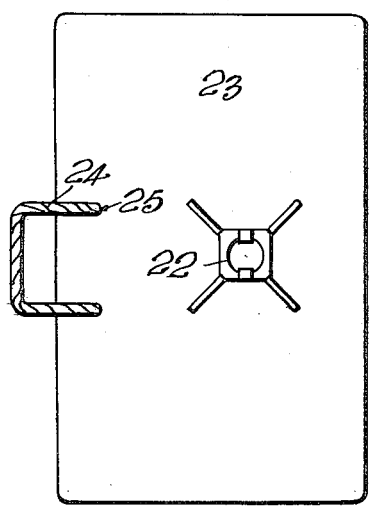
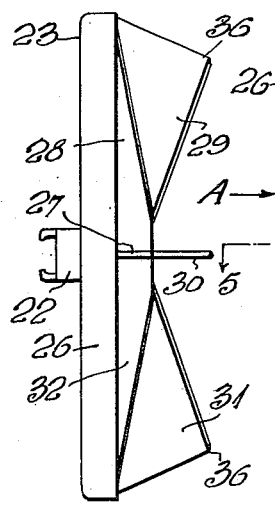
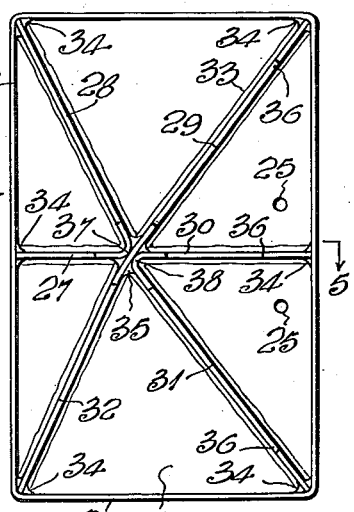
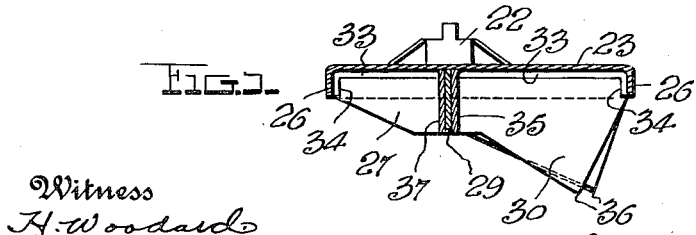
Witness
H. Woodard
Inventor
B. P. Joyce
By H. B. Wilson & Co.
Attorneys.

July 7, 1936.　　　　　B. P. JOYCE　　　　　2,046,518
SEPARABLE GUN MOUNT
Filed May 25, 1935　　　　4 Sheets-Sheet 2
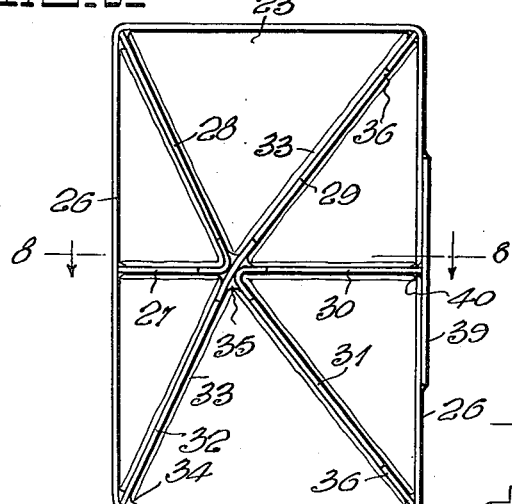
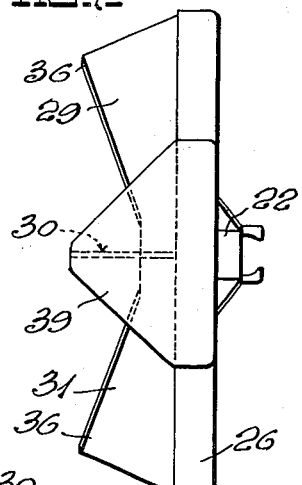
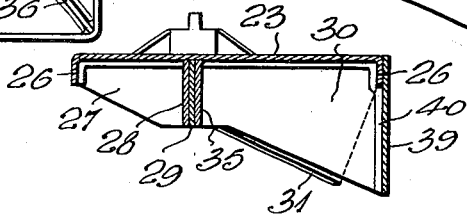
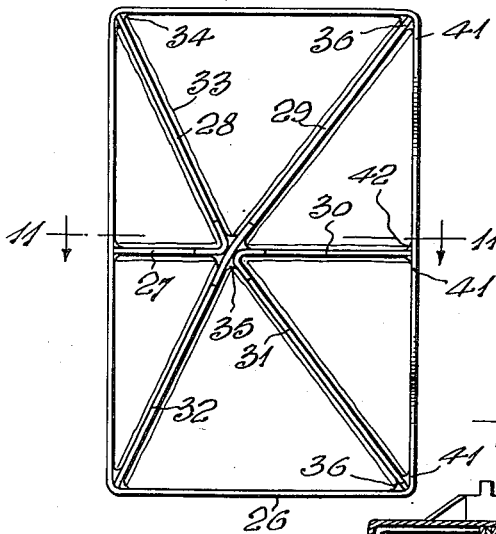
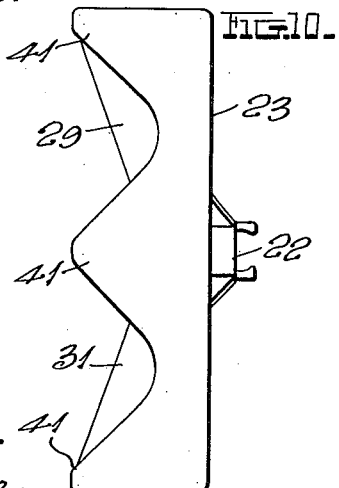
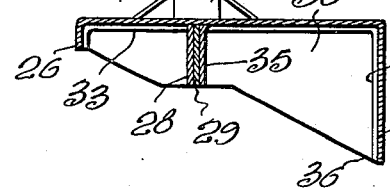
Inventor
B. P. Joyce

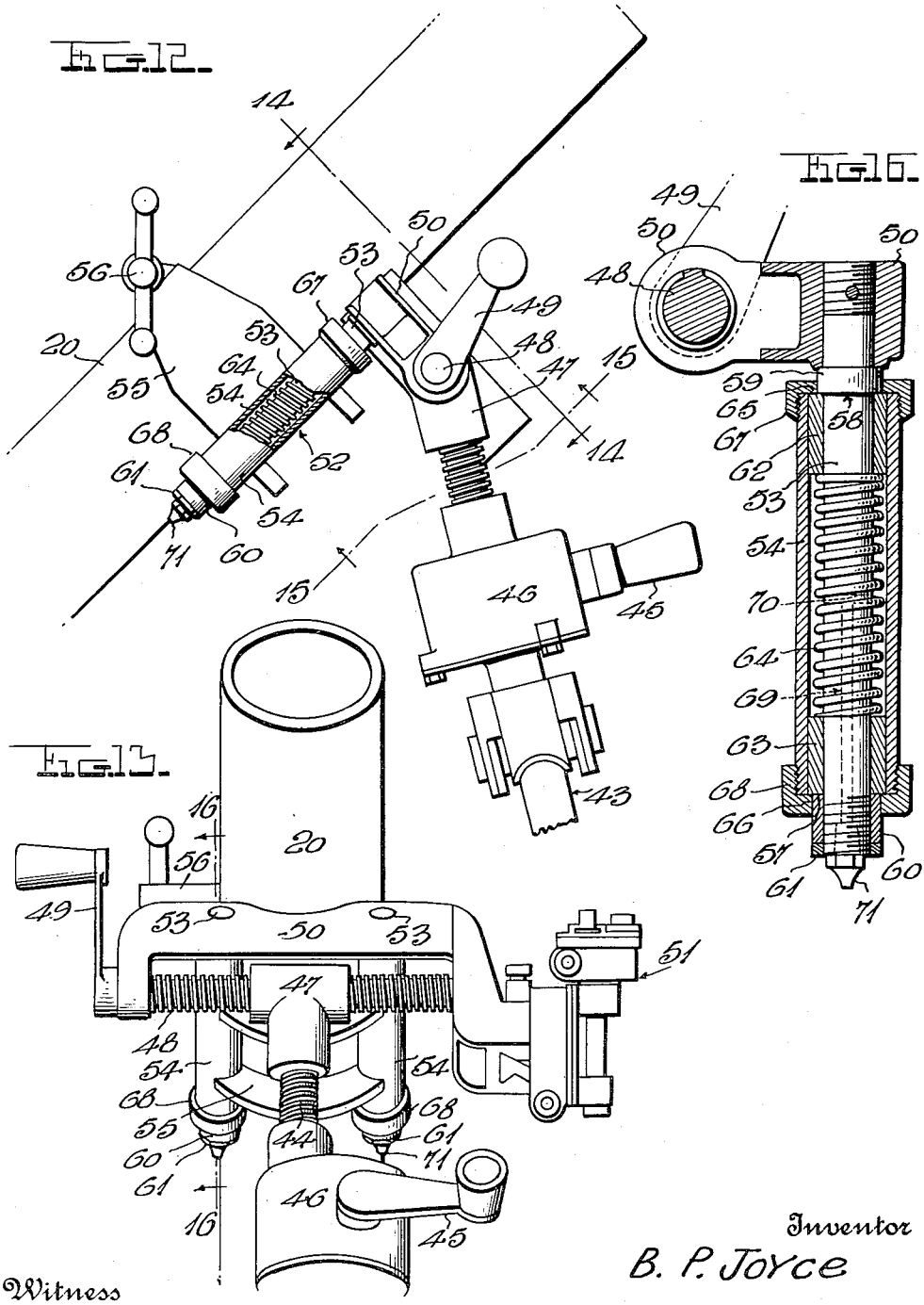

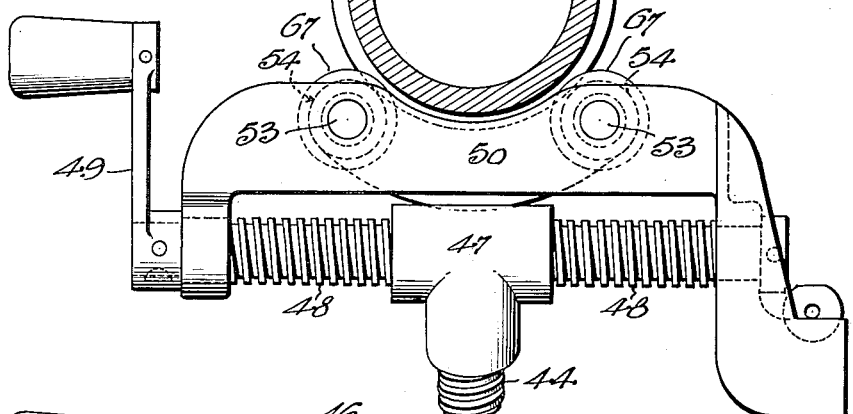
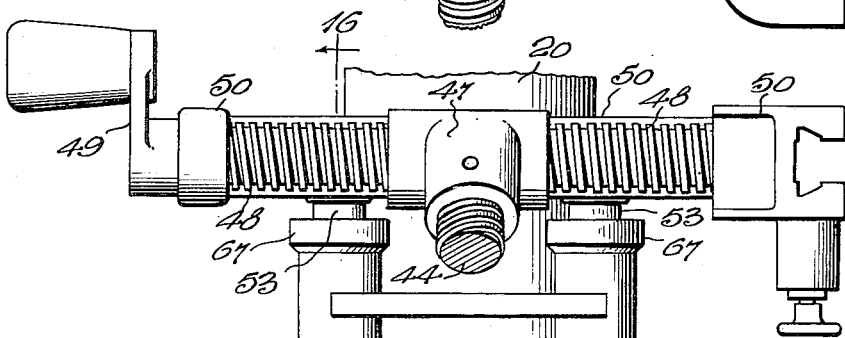
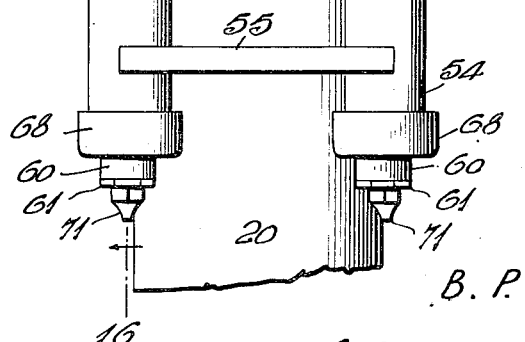

Patented July 7, 1936

2,046,518

UNITED STATES PATENT OFFICE 2,046,518

SEPARABLE GUN MOUNT

Bryan P. Joyce, East Orange, N. J., assignor to American Armament Corporation, New York, N. Y., a corporation of New York Application May 25, 1935, Serial No. 23,508

5 Claims. (Cl. 89—37)

The invention relates to ordnance and more particularly to gun-mounting means, said mounting means being primarily intended for field or trench mortars.

The mortar barrel is provided at its breech with a base to engage the ground, and one object of the invention is to provide an improved base structure which will tenaciously engage the ground to effectively anchor the rear portion of the mortar.

A front supporting structure, usually a bipod, is provided for the front portion of the mortar barrel and includes means for adjusting said barrel for altitude and traverse, and a further aim of the invention is to provide an improved shock-absorbing connection between said front supporting structure and barrel which will take up the shocks occasioned by firing and recoil, this being particularly advantageous when said supporting structure carries a more or less delicate sighting device such as a panoramic collimator sight.

A still further object is to provide a structure which will be of light weight and will not, therefore, seriously handicap infantry to whose lot falls the duty of carrying the mortars from place to place, and setting them up at strategic positions.

With the foregoing in view, the invention resides in the novel subject matter hereinafter described and claimed, description being accomplished by reference to the accompanying drawings.

Fig. 1 is a side elevation of a mortar embodying the invention.

Fig. 2 is a top plan view of the breech-supporting base.

Fig. 3 is a bottom plan view of said base.

Fig. 4 is an edge view of the base looking in the direction indicated by the arrow A of Fig. 3.

Fig. 5 is a vertical sectional view on line 5—5 of Fig. 3.

Fig. 6 is a bottom plan view showing a modified form of the breech-supporting base.

Fig. 7 is a rear edge view of the base shown in Fig. 6.

Fig. 8 is a vertical sectional view on line 8—8 of Fig. 6.

Figs. 9, 10, and 11 are views similar to Figs. 6, 7, and 8 but showing a second modified form of base construction, Fig. 11 being cut on line 11—11 of Fig. 9.

Fig. 12 is an enlarged side elevation partly broken away and in section showing the shock-absorbing connecting means between the front portion of the barrel and the front supporting structure.

Fig. 13 is a front elevation of the construction shown in Fig. 12.

Figs. 14 and 15 are sectional views on lines 14—14 and 15—15 of Fig. 12.

Fig. 16 is a sectional view on line 16—16 of Figs. 13 and 15.

In the drawings above briefly described, preferred features of construction have been illustrated and will be herein specifically explained, with the understanding however, that within the scope of the invention as claimed, variations may be made.

The breech portion of the mortar barrel 20 is provided with a pivot member 21 separably engaged with a second pivot member 22 rigidly secured upon the top of a base plate 23, said pivot members 21 and 22 being preferably in the form of a ball and a socket respectively, disconnectable from each other by proper relative turning of said barrel and base plate. The base plate 23 may be provided with a suitable carrying handle 24 which may well be of hemp passed through openings 25 in said base plate and knotted under the same.

The base plate 23 is of rectangular form and is provided at its edge with a continuous integral downwardly projecting anchoring flange 26. The lower side of this base plate, within the confines of the flange 26, is provided with plate-reinforcing and anchoring webs 27, 28, 29, 30, 31, and 32, said webs being welded to said plate at 33, welded to said flange at 34 and welded to each other at 35, the welding 35 being directly under the pivot member 22 so that the various webs radiate from the zone of the plate which receives the greatest shock, strain or load, said webs, therefore, effectively reinforcing said plate against distortion, in addition to acting as effective anchoring means. During firing, these webs and the flange 26 embed themselves firmly in the earth and finally the plate 23 rests solidly upon the earth, the rear end of the mortar being thus securely anchored.

The webs 32, 27, and 28 which extend toward the front portion of the base plate 23 are preferably tapered as shown for instance in Figs. 1 and 4 so that they gradually increase from about the width of the flange 26 at their front ends to a somewhat greater width in the region of the welding 35. The webs 29, 30, and 31 which extend toward the rear portion of the plate are gradually widened downwardly to a width much greater than that of said flange, and all or some of these webs are provided with sharp earth-penetrating corners 36.

The webs 29 and 32 are formed from a single substantially straight metal strip. The webs 27 and 28 are formed from a metal strip bent into acute angular form with the bight portion 37 disposed at the central portion of the strip 29, 32. The webs 30 and 31 are also formed from a single strip bent into acute angular form, with the bight portion 38 opposite the bight portion 37, these bight portions being securely fastened to the strip 29, 32, by the welding 35.

The web 28 extends forwardly to one corner of the base plate 23, web 32 extends forwardly to the other front corner of said base plate, the two webs 29, 31 extend to the rear corners of said plate, and the webs 27 and 30 are disposed at the longitudinal center of the plate.

The construction and arrangement of webs greatly facilitates manufacture, provides an unusually strong reinforcing means to prevent distortion of the base plate 23, and constitutes effective anchoring means for said plate.

In the construction shown in Figs. 6, 7, and 8, a downwardly pointed anchoring plate 39 is welded to the rear portion of the flange 26 and projects downwardly therefrom, the downwardly widened rear end of the web 30 extends entirely to this anchoring plate, and said plate and web end are welded together at 40. This provides additional earth-engaging anchoring means for the base plate.

In Figs. 9, 10, and 11, the rear portion of the flange 26 is downwardly widened and is shaped to provide a plurality of earth-engaging anchoring teeth 41, one of which is centrally located. This tooth is welded to the downwardly widened rear end of the web 30 as shown at 42, providing still further plate-anchoring means.

A front supporting structure 43 is provided for the front end of the barrel 20, said supporting structure being preferably in the form of a foldable bipod. In the present showing this bipod includes a vertical screw 44 adjustable by a crank 45 and a gearing and nut assembly in the casing 46, a nut 47 carried by the upper end of said screw 44, a traversing screw 48 engaged with said nut and provided with a hand-crank 49, and an arched cradle 50 supported by said screw 48. This cradle, in the present showing, carries a panoramic collimator sight 51.

A shock-absorbing connecting means 52 is provided between the upper end of the front supporting structure 43 and the front portion of the barrel 20, said connecting means including two plunger rods 53 secured to and projecting rearwardly from the cradle 50, two cylinders 54 rigidly secured to the barrel 20, and yieldable means operatively connecting said plunger rods and cylinders for absorbing shocks in both directions, as will be herein more fully described.

In the present showing, the cylinders 54 are integral with or otherwise rigidly joined to a clamp 55 surrounding the barrel 20 and provided with a clamp screw 56 by means of which it may be quickly applied and released.

The features of construction common to one plunger rod 53 and its respective cylinder 54, are also common to the other plunger rod and cylinder and hence a description of one assembly will suffice, particular reference being made to Fig. 16. From this view, it will be seen that the rod 53 is provided with a rearwardly located forwardly facing shoulder 57 and with a forwardly located rearwardly facing shoulder 58. Shoulder 58 may well be formed by the rear end of an integral enlargement 59 on the rod 53. Shoulder 57, however, is preferably formed by the front end of a collar 60 which is secured on the rear end of rod 53 by threading it thereon, and providing a locknut 61. Front and rear sleeves 62 and 63 slidably surround the rod 53 and abut the shoulders 58 and 57 respectively, and a compression spring 64 (preferably a common coil spring) surrounds said rod between said sleeves and abuts both of these sleeves. The rod 53, sleeves 62 and 63, and spring 64 are received in the cylinder 54, said sleeves and cylinder being slidably engaged. This cylinder is provided with one shoulder 65 abutting the front end of the sleeve 62, and with another shoulder 66 abutting the rear end of the sleeve 63, said shoulders 65 and 66 being preferably formed by portions of front and rear caps 67 and 68 threaded upon the tubular wall of the cylinder 54. These caps are apertured to receive the enlargement 59 and the collar 60.

When the barrel kicks rearwardly, the cylinder 54 moves with it, causing shoulder 65 to rearwardly slide the sleeve 62 against the resistance afforded by the spring 64, absorbing the shock. Upon recoil, cylinder 54 moves forwardly with the barrel, causing shoulder 66 to forwardly slide sleeve 63 against the resistance of the spring 64, thereby also absorbing this shock.

It will be seen from the above that effective provision has been made for absorbing the shocks incident of firing and recoil, which is of particular advantage in protecting the collimator sight 51 against severe jars.

Lubrication for working parts may be provided for in any suitable way. For illustrative purposes, I have shown a longitudinal lubricant port 69 and a communicating transverse port 70 in the plunger rod 53, and a lubricant admission nipple 71 communicating with said port 69, whereby lubricant may be forced into the cylinder 54.

It will be seen from the above that novel provision has been made for carrying out the objects of the invention. Attention is again invited to the possibility of making numerous variations within the scope of the invention as claimed.

I claim:—

1. In a gun, a base plate, and a plurality of vertical plate-reinforcing and anchoring webs at the lower side of said base plate, said webs being formed from a plurality of metal strips, one of said strips being substantially straight, the other strips being bent into angular form and disposed at opposite sides of said one strip, the bight portions of said other strips being welded to the central portion of said one strip, the upper edges of all of said strips being welded to said base plate.

2. In a gun, a base plate, and a plurality of plate-reinforcing and anchoring webs at the lower side of said plate, at least some of said webs being formed of metal strips bent into angular form, said strips having their bight portions welded together under the load-supporting zone of said base plate and having their upper edges welded to said base plate; together with a continuous downwardly projecting flange at the edge of said base plate and welded to the outer ends of said strips.

3. A structure as specified in claim 1; together with a continuous downwardly projecting flange at the edge of said base plate and welded to the outer ends of said strips.

4. In a gun, a base plate, and a plurality of plate-reinforcing and anchoring webs at the lower side of said plate, at least some of said webs being formed of metal strips bent into angular form, said strips having their bight portions welded together under the load-supporting zone of said base plate and having their upper edges welded to said base plate; one of said webs being centrally disposed and having a downwardly widened rear end, a downwardly projecting flange around the edge of said base plate of less height than said widened web end, and a vertical anchoring plate welded to said flange and said widened web end.

5. In a gun, a base plate, and a plurality of plate-reinforcing and anchoring webs at the lower side of said plate, at least some of said webs being formed of metal strips bent into angular form, said strips having their bight portions welded together under the load-supporting zone of said base plate and having their upper edges welded to said base plate; one of said webs being centrally disposed and having a downwardly widened rear end, a downwardly projecting flange around the edge of said base plate and having a relatively wide rear portion shaped to provide anchoring teeth, one of said teeth being centrally located and welded to said widened web end.

BRYAN P. JOYCE.